US011496905B2

(12) United States Patent
Jeon et al.

(10) Patent No.: US 11,496,905 B2
(45) Date of Patent: Nov. 8, 2022

(54) RESOURCE RESERVATION FOR SHARED SPECTRUM SYSTEMS

(71) Applicant: Samsung Electronics Co., Ltd., Suwon-si (KR)

(72) Inventors: Jeongho Jeon, San Jose, CA (US); Vishnu Vardhan Ratnam, Plano, TX (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 16/729,042

(22) Filed: Dec. 27, 2019

(65) Prior Publication Data
US 2020/0221305 A1 Jul. 9, 2020

Related U.S. Application Data

(60) Provisional application No. 62/787,818, filed on Jan. 3, 2019.

(51) Int. Cl.
*H04W 16/14* (2009.01)
*H04W 72/08* (2009.01)

(52) U.S. Cl.
CPC ......... *H04W 16/14* (2013.01); *H04W 72/082* (2013.01)

(58) Field of Classification Search
CPC ... H04W 72/082; H04W 72/10; H04W 28/26; H04W 72/0446; H04W 16/14
See application file for complete search history.

(56) References Cited

U.S. PATENT DOCUMENTS 8,868,097 B2 * 10/2014 Kwon .................. H04W 16/14
455/454
10,397,794 B2 * 8/2019 Suzuki ............... H04W 74/004
(Continued)

FOREIGN PATENT DOCUMENTS

WO    2017/052517 A1    3/2017

OTHER PUBLICATIONS

Notification of Transmittal of the International Search Report and the Written Opinion of the International Searching Authority dated Apr. 8, 2020 in connection with International Patent Application No. PCT/KR2012/000121, 10 pages.
(Continued)

*Primary Examiner* — Dai Phuong

(57) ABSTRACT

A method and a network entity in a wireless communication system sharing spectrum resources. The method includes identifying a coordination phase to identify at least one neighboring network entity using the shared spectrum resources and perform reservation of the shared spectrum resources and transmitting, during the coordination phase, a coordination request message to the at least one neighboring network entity. The method further includes receiving, during the coordination phase, a coordination response message from the at least one neighboring network entity and determining an amount of the shared spectrum resources to reserve based on the coordination response message. The method further includes transmitting, to at least one terminal in a cell of the network entity, a data transmission using at least some of the determined amount of the reserved resources.

18 Claims, 15 Drawing Sheets

(56) References Cited

U.S. PATENT DOCUMENTS

| | | | |
|---|---|---|---|
| 2010/0035557 A1* | 2/2010 | Shellhammer | H04W 16/14 455/67.11 |
| 2015/0351118 A1 | 12/2015 | Arnott et al. | |
| 2016/0088484 A1 | 3/2016 | Yang et al. | |
| 2017/0099605 A1 | 4/2017 | Li et al. | |
| 2017/0170888 A1* | 6/2017 | Yrjola | H04B 7/0619 |
| 2017/0222696 A1* | 8/2017 | Ji | H04L 5/0051 |
| 2018/0184463 A1* | 6/2018 | Fakoorian | H04W 16/14 |
| 2018/0249380 A1 | 8/2018 | Zhang et al. | |
| 2018/0263042 A1* | 9/2018 | Montojo | H04W 72/10 |
| 2019/0021011 A1* | 1/2019 | Zhang | H04W 72/0453 |
| 2020/0107199 A1* | 4/2020 | Badic | H04W 24/08 |

OTHER PUBLICATIONS

Federal Communications Commission, "Report and Order and Further Notice of Proposed Rulemaking", FCC 16-89, Jul. 14, 2016, 278 pages.

Federal Communications Commission, "Order on Reconsideration and Second Report and Order", FCC 16-55, May 2, 2016, 123 pages.

Paul et al., "Understanding Traffic Dynamics in Cellular Data Networks", Proceedings IEEE INFOCOM, Apr. 2011, 9 pages.

"5 GHz RLAN; Harmonised Standard covering the essential requirements of article 3.2 of Directive 2014/53/EU", ETSI EN 301 893 V2.0.7, Nov. 2016, 123 pages.

Xu et al., "Understanding Mobile Traffic Patterns of Large Scale Cellular Towers in Urban Environment", IEEE/ACM Transactions on Networking (TON), vol. 25, No. 2, Apr. 2017, pp. 1147-1161.

Buddhikot et al., "DIMSUMnet: New Directions in Wireless Networking Using Coordinated Dynamic Spectrum Access", Sixth IEEE International Symposium on a World of Wireless Mobile and Multimedia Networks (IEEE WoWMoM05), Jun. 2005, 11 pages.

Singh et al., "Coordination protocol for inter-operator spectrum sharing in co-primary 5G small cell networks", IEEE Communications Magazine, vol. 53, No. 7, Jul. 2015, 10 pages.

Extended European Search Report dated Aug. 8, 2022 regarding Application No. 20736093.4, 10 pages.

\* cited by examiner

RESOURCE RESERVATION FOR SHARED SPECTRUM SYSTEMS

CROSS-REFERENCE TO RELATED APPLICATIONS AND CLAIM OF PRIORITY

The present application claims priority to U.S. Provisional Patent Application No. 62/787,818, filed on Jan. 3, 2019. The content of the above-identified patent document is incorporated herein by reference.

TECHNICAL FIELD

The present application relates generally to wireless communication systems, more specifically, the present disclosure relates to resource reservation operation in an advanced shared spectrum wireless communication system.

BACKGROUND

In US, unlicensed or shared spectrums are continuously being opened or planned to be opened by federal communications commission (FCC). For example, 3.55-3.7 GHz CBRS band has a unique three-tiered access model, which includes incumbent (federal user, fixed satellite service), priority access licensees (PALs), and general authorized access (GAA) in descending order of priority [FCC 16-55]. For another example, 5925-7125 MHz band and 5925-6425 MHz band are under consideration in US and EU, respectively, for unlicensed use. Regulation is expected to be finished in 2019-2020 time-frame. For another example, 37-38.6 GHz band is expected to be opened. When FCC published the rules for spectrum frontiers (5G), it was suggested that the band could be shared between commercial systems and "future" federal systems. The sharing framework is expected to be distinguished from general unlicensed spectrum [FCC 16-89]. For another example, 60 GHz band had been extended to 57-71 GHz for unlicensed use [FCC 16-89]. Opening more unlicensed or shared spectrums can be seen as a global trend. It can be seen that the spectrum utilizations fluctuate temporally and geographically. Sharing the spectrum via multiplexing between different entities will enable more efficient utilization of the spectrum, whether it is unlicensed or shared spectrum. In existing unlicensed spectrums, e.g., 2.4 GHz, 5 GHz, the channel access is based on random access, i.e., CSMA/CA. It is known that CSMA/CA with exponential back-off lowers the airtime utilization efficiency when the network densifies. Fundamentally, there is no promise on the accessibility of the spectrum. Also, sharing itself is non-cooperative as the sharing is based on regulations set by regulatory bodies and the sharing is controlled by fixed rules, e.g., [EN 301 893].

SUMMARY

The present disclosure relates to resource reservation operation in an advanced shared spectrum wireless communication system.

In one embodiment, a network entity in a wireless communication system of shared spectrum resources is provided. The network entity includes a processor configured to identify a coordination phase to identify at least one neighboring network entity using the shared spectrum resources and perform reservation of the shared spectrum resources. The network entity further includes a transceiver operably connected to the processor. The transceiver is configured to transmit, during the coordination phase, a coordination request message to the at least one neighboring network entity; and receive, during the coordination phase, a coordination response message from the at least one neighboring network entity. The processor is configured to determine an amount of the shared spectrum resources to reserve based on the coordination response message. The transceiver is configured to transmit, to at least one terminal in a cell of the network entity, a data transmission using at least some of the determined amount of the reserved resources.

In another embodiment, a method of network entity in a wireless communication system sharing spectrum resources is provided. The method includes identifying a coordination phase to identify at least one neighboring network entity using the shared spectrum resources and perform reservation of the shared spectrum resources and transmitting, during the coordination phase, a coordination request message to the at least one neighboring network entity. The method further includes receiving, during the coordination phase, a coordination response message from the at least one neighboring network entity and determining an amount of the shared spectrum resources to reserve based on the coordination response message. The method further includes transmitting, to at least one terminal in a cell of the network entity, a data transmission using at least some of the determined amount of the reserved resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

In the present disclosure, the term "shared spectrum" is used in an inclusive manner without the distinction on the shared spectrum and unlicensed spectrum and it also includes not only the currently available spectrums but also spectrums that will be made available in the future. Thus, the term "shared spectrum" should not be interpreted as a limiting factor in determining the scope of the present disclosure.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: "[FCC 16-89] Federal Communications Commission, REPORT AND ORDER AND FURTHER NOTICE OF PROPOSED RULEMAKING," Jul. 14, 2016; "[FCC 16-55] Federal Communications Commission, ORDER ON RECONSIDERATION AND SECOND REPORT AND ORDER," May 2, 2016; and "[EN 301 893] ETSI EN 301 893, 5 GHz RLAN; Harmonized Standard covering the essential requirements of article 3.2 of Directive 2014/53/EU," V2.0.7 (2016-11).

Figure 1:
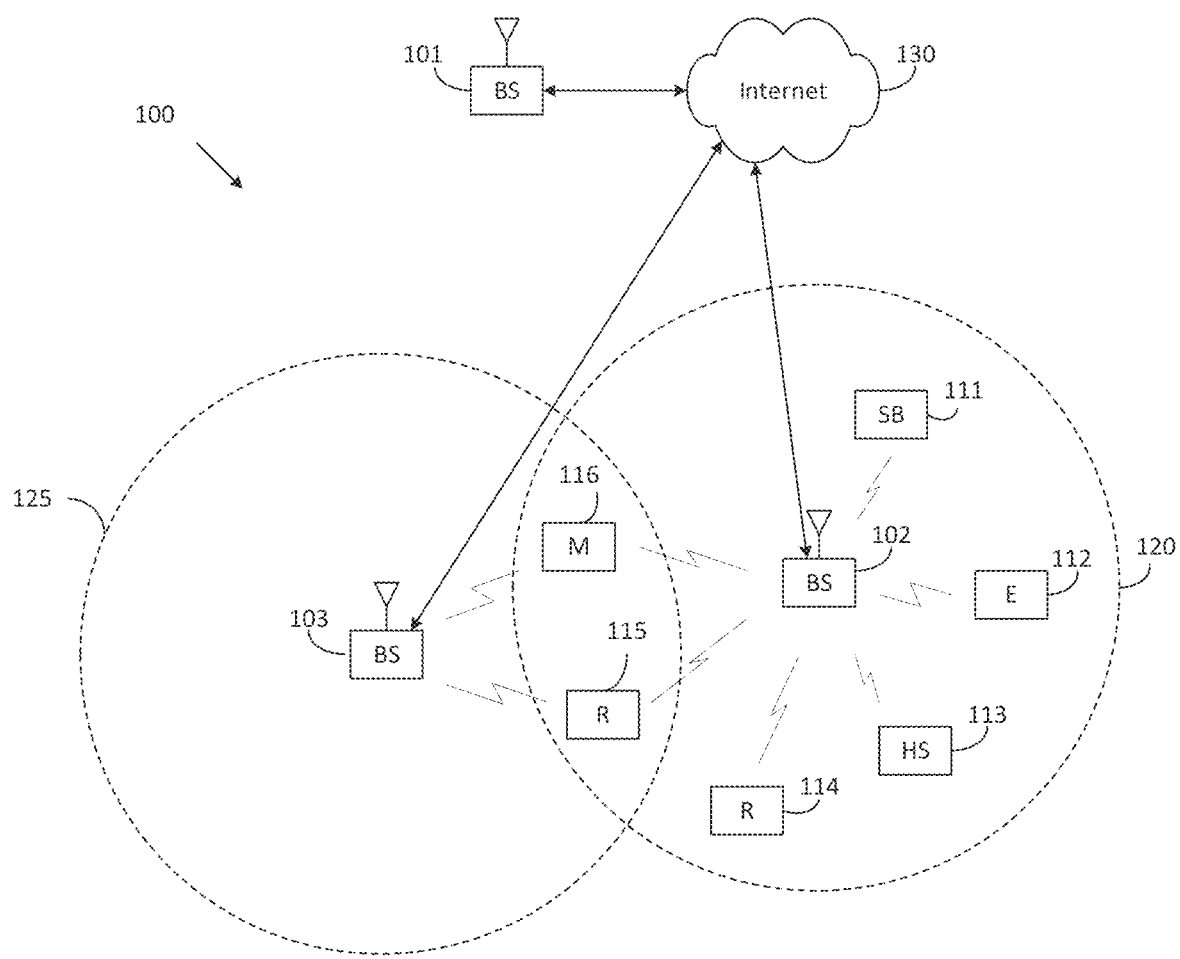
FIG. 1 illustrates an example wireless network according to embodiments of the present disclosure.
Figure 2:
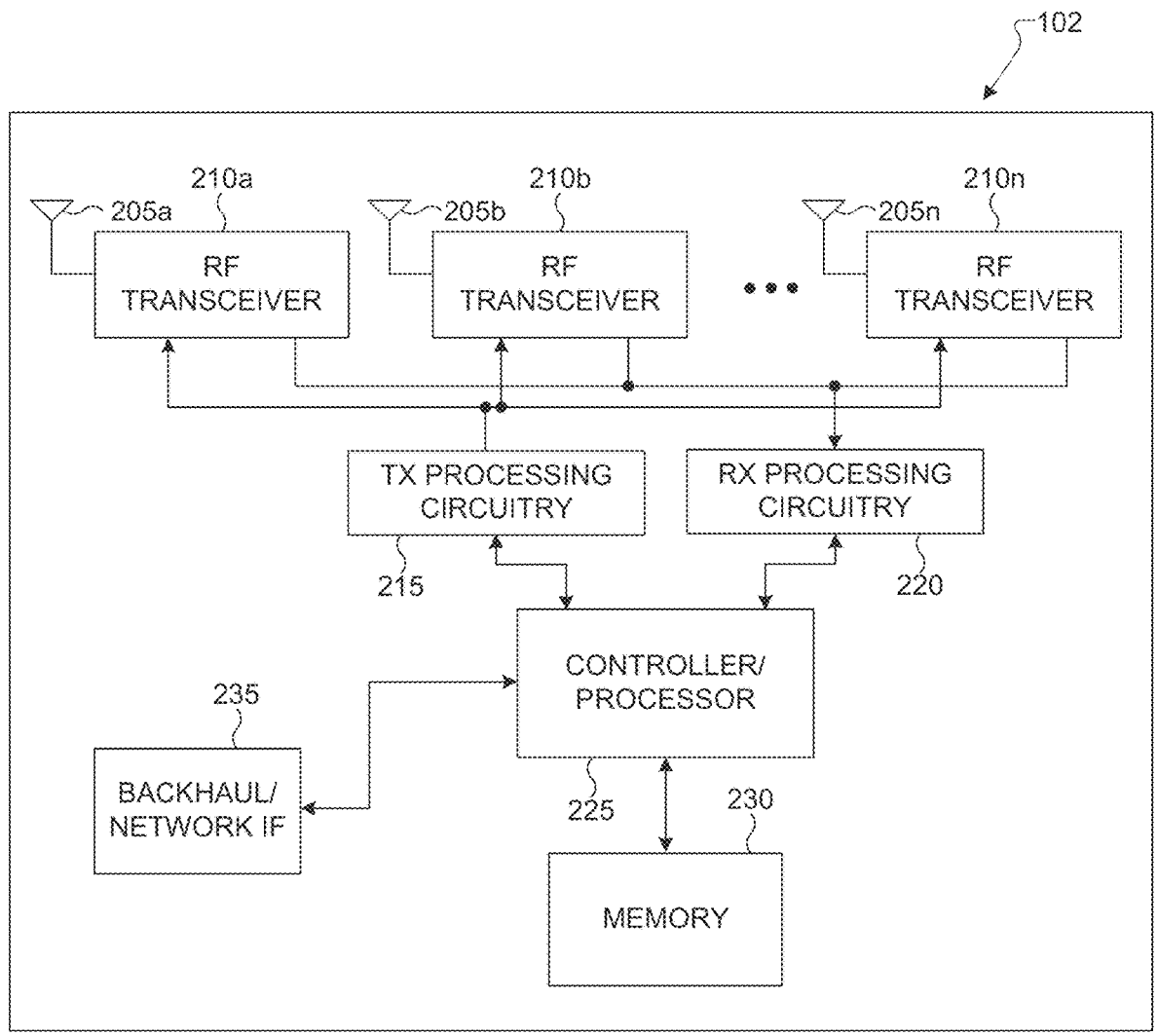
FIG. 2 illustrates an example gNB according to embodiments of the present disclosure.
Figure 3:
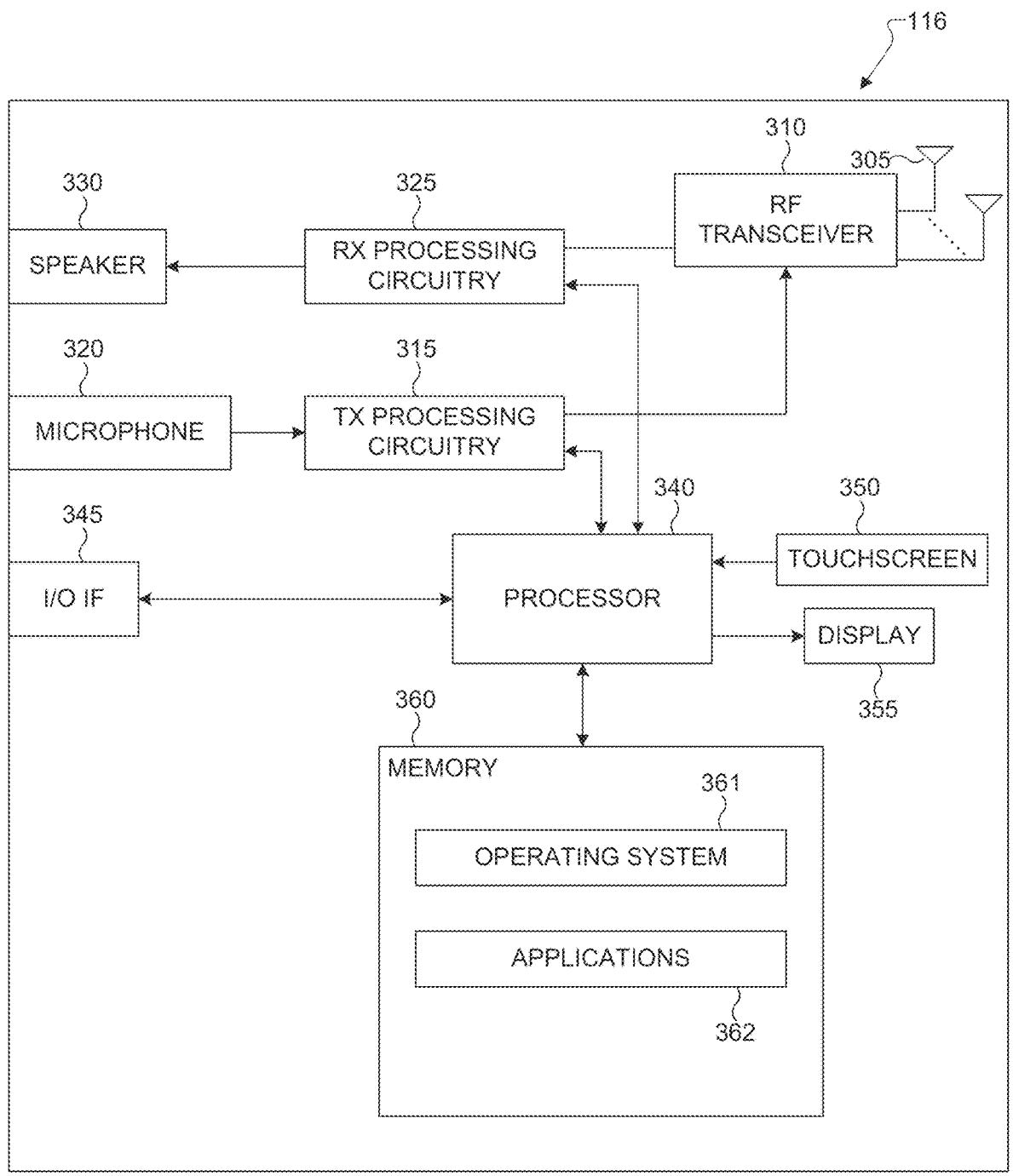
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes network entities including a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, Wi-Fi, or other wireless communication techniques.

Depending on the network type, the term "network entity," "base station," or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a Wi-Fi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient resource reservation for shared spectrum systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. In various embodiments, the processor 340 is a signal processor to control processing of signals transmitted by the UE 116 and signals received by the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols.

A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
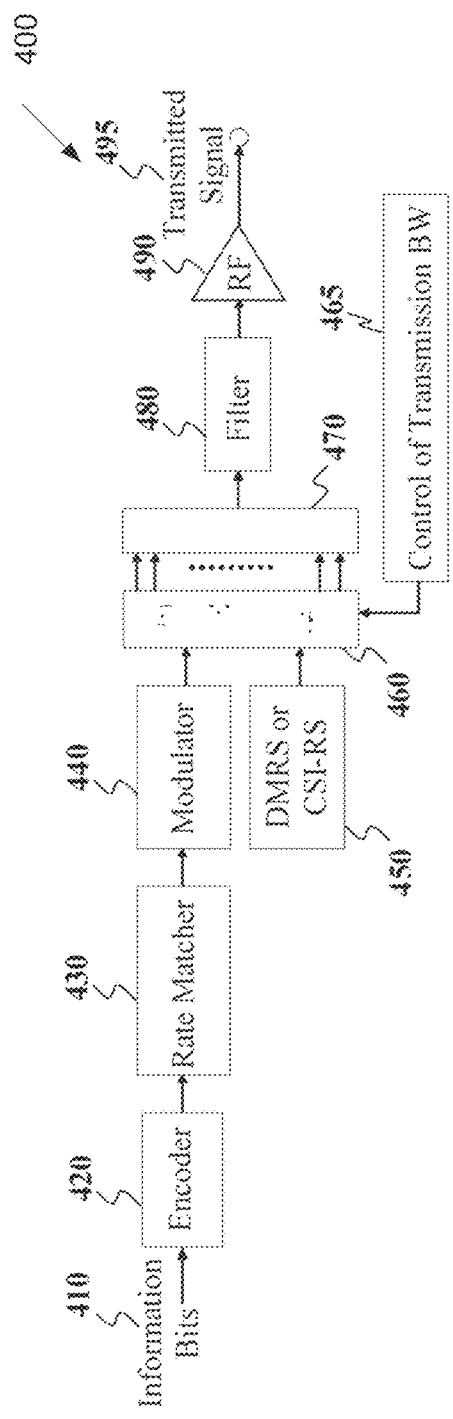
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
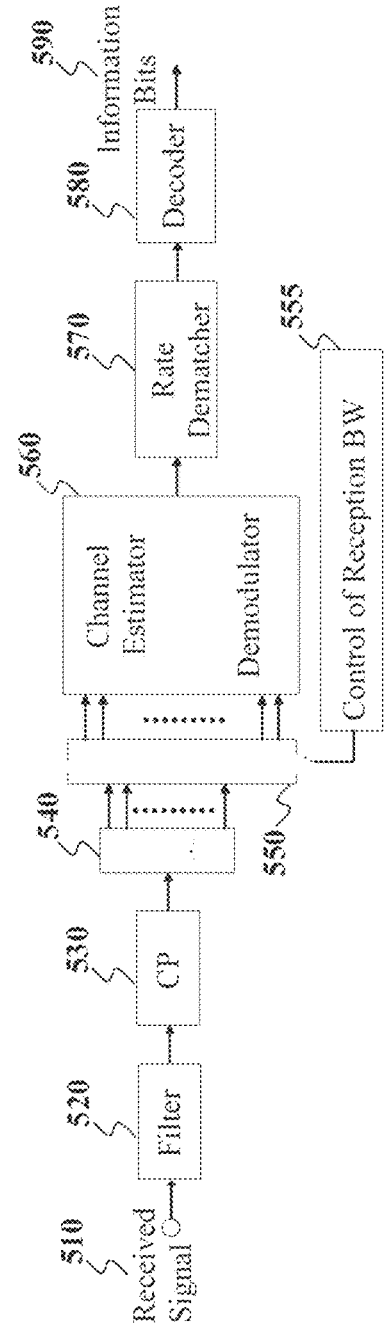
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
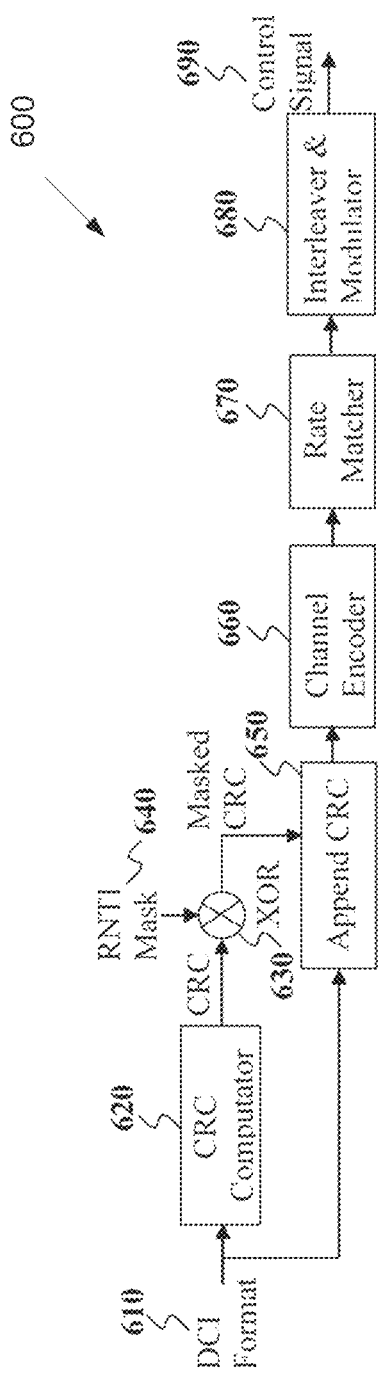
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be performed by specialized circuitry configured to perform the noted functions or one or more of the components can be performed by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
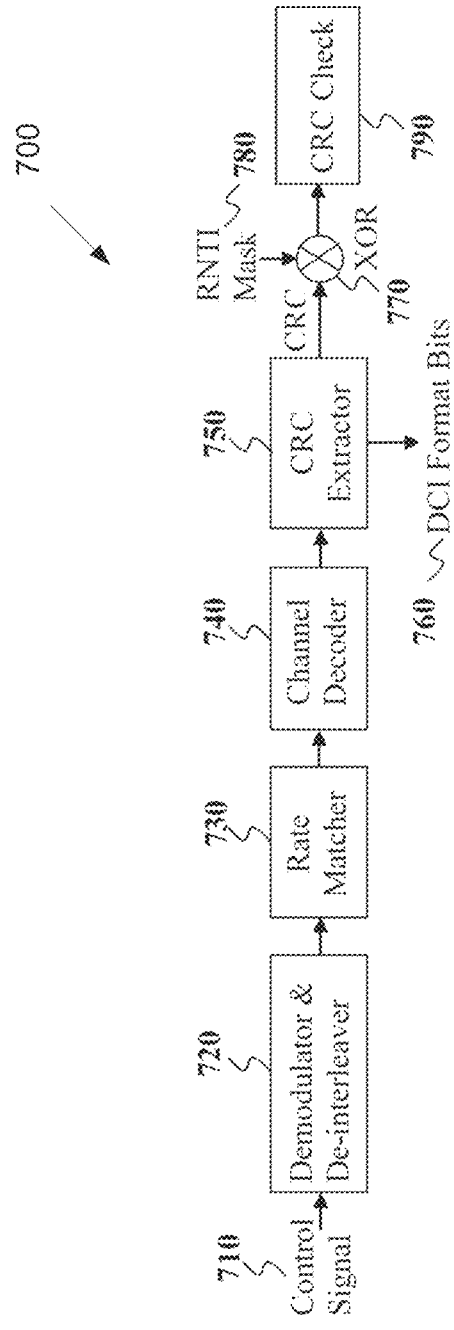
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be performed by specialized circuitry configured to perform the noted functions or one or more of the components can be performed by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (checksum is zero), the DCI format information bits are considered to be valid. When the CRC check does not succeed, the DCI format information bits are considered to be invalid.

Figure 8:
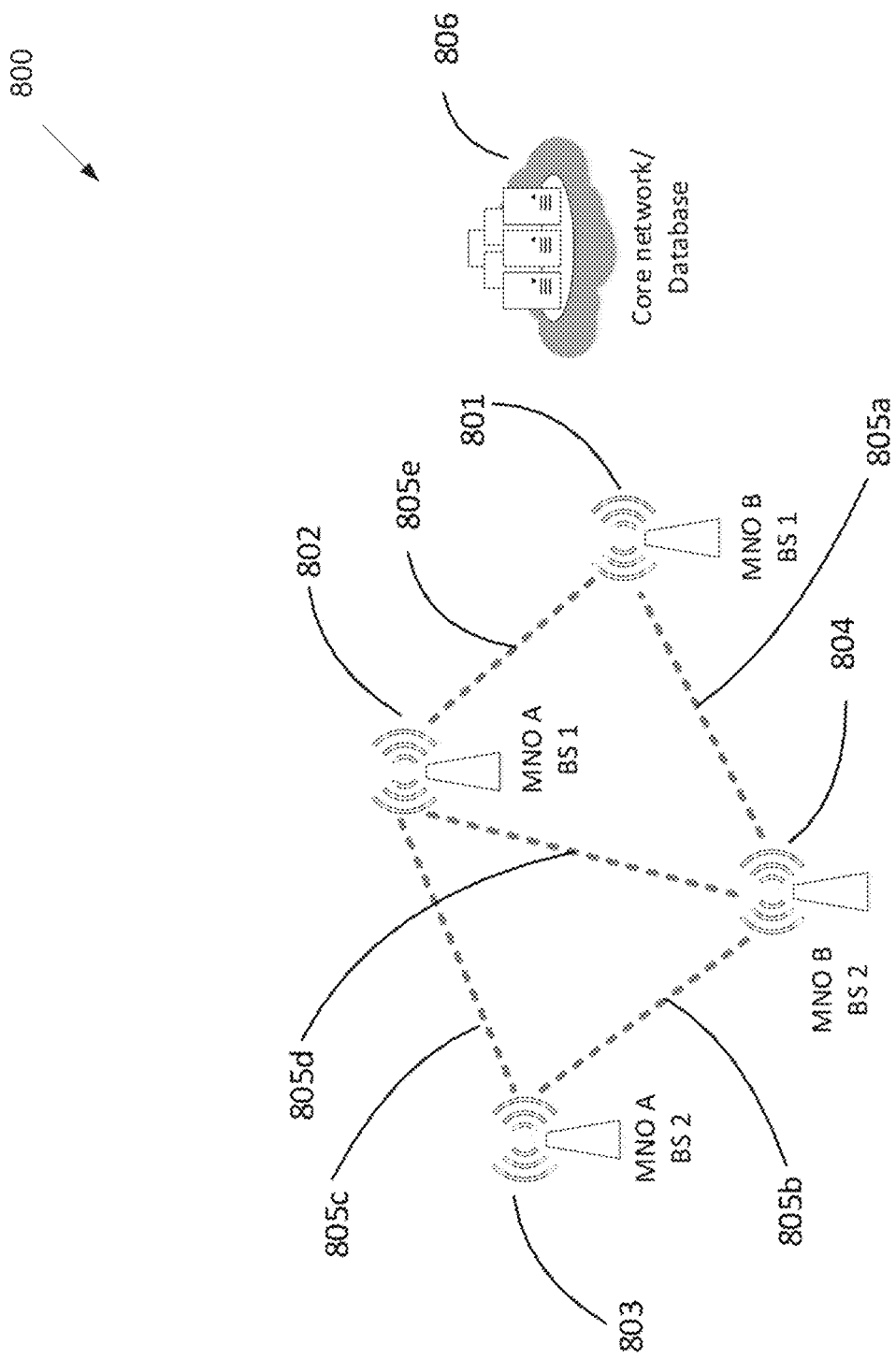
FIG. 8 illustrates an example multiple base stations (BS) of different MNOs according to embodiments of the present disclosure.

FIG. 8 illustrates an example multiple base stations (BS) of different MNOs in a network 800 according to embodiments of the present disclosure. An embodiment of the multiple BSs of different MNOs in network 800 shown in FIG. 8 is for illustration only. Other embodiments are used without departing from the scope of the present disclosure.

FIG. 8 illustrates a schematic diagram illustrating a network 800 for spectrum sharing where multiple BSs from different MNOs coexist in proximity. As an example, a BS 801 and a BS 804 belong to one operator (MNO B) and a BS 802 and a BS 803 belong to another operator (MNO A). The figure should not be interpreted as a limiting factor of the scope of the present disclosure. In other words, there could be multiple different operators with multiple different systems and technologies sharing the spectrum. Elements 805 a, 805 b, 805 c, 805 d, and 805 e show the interfering relationship. An entity 806 can be, as an example, core network of each operator or can be also a database which does not belong to any of the operators and communicates with operators.

Figure 9:
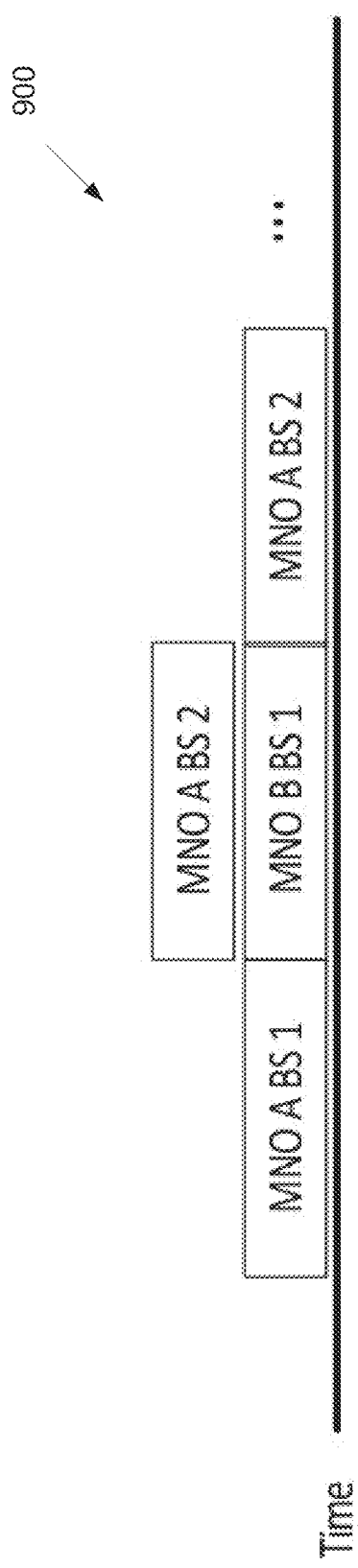
FIG. 9 illustrates an example spectrum sharing according to embodiments of the present disclosure.

FIG. 9 illustrates an example spectrum sharing 900 according to embodiments of the present disclosure. An embodiment of the spectrum sharing 900 shown in FIG. 9 is for illustration only. Other embodiments are used without departing from the scope of the present disclosure.

FIG. 9 illustrates a spectrum sharing situation among different BSs belonging to different MNOs from the network 800. As the BS 801 and the BS 803 are geographically separated and not in the interfering relationship, both of the BSs may transmit simultaneously. On the other hand, as a set of BSs 801, 802, and 804, and a set of BSs 802, 803, and 804 are in a mutually interfering relationship, the set of BSs may share the resources in an orthogonal manner.

The sharing can be enabled in time and/or geographical domains. That is: the spectrum can be shared in a time division multiplexing (TDM) manner between systems/technologies; and the spectrum can be reused simultaneously by geographically separated systems/technologies via spatial reuse.

The sharing framework disclosed in the embodiments of the present disclosure can achieve the above time and/or geographical sharing in a localized and autonomous manner.

Figure 10:
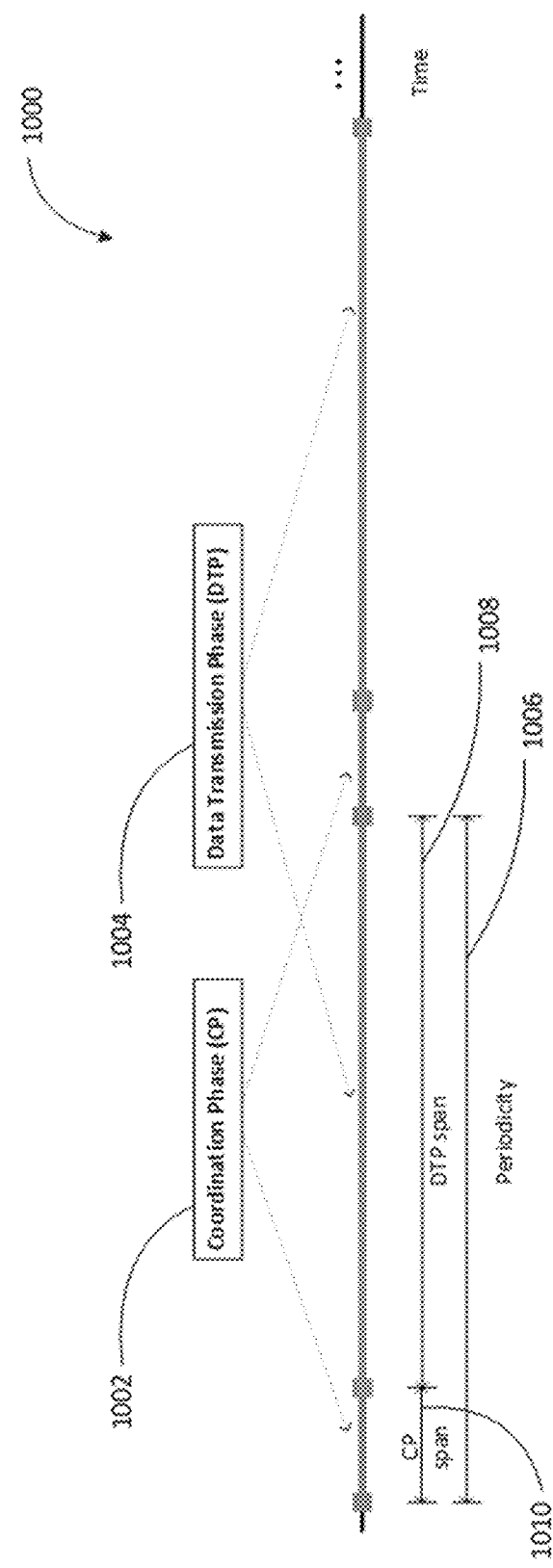
FIG. 10 illustrates an example overall sharing framework according to embodiments of the present disclosure.

FIG. 10 illustrates an example overall sharing framework 1000 according to embodiments of the present disclosure. An embodiment of the overall sharing framework 1000 shown in FIG. 10 is for illustration only. Other embodiments are used without departing from the scope of the present disclosure.

In one embodiment, a sharing framework can include a coordination phase (CP) and a data transmission phase (DTP) to enable the spectrum sharing for the network 800 as illustrated in FIG. 10. The CP, 1002, can be used for over-the-air (OTA) communications between BSs of same/different operators. During the CP, each BS can perform identification of the neighboring BSs, potential parameter negotiation, resource reservation for the following DTP and/or other DTPs, and other coordination operations. The duration of CP 1010 is located within the corresponding periodicity 1006. The DTP 1004 can be used for coordinated data transmissions by BSs according to the resource reservation made during CP, which may also allow opportunistic data transmissions based on listen-before-talk (LBT), e.g., in the cases that the reserved medium is not utilized. The duration of DTP 1008 is indicated. In another embodiment, the CP and DTP can use different frequency or code resources.

The resource utilization efficiency of the provided scheme is proportional to the DTP span 1008 divided by periodicity 1006 in FIG. 10. The tradeoff between resource utilization efficiency and agility to re-coordinate can be seen. In one embodiment, the CP span, DTP span, and periodicity can be fixed. In another embodiment, one or more of CP span, DTP span, or periodicity can be adjusted.

Figure 11:
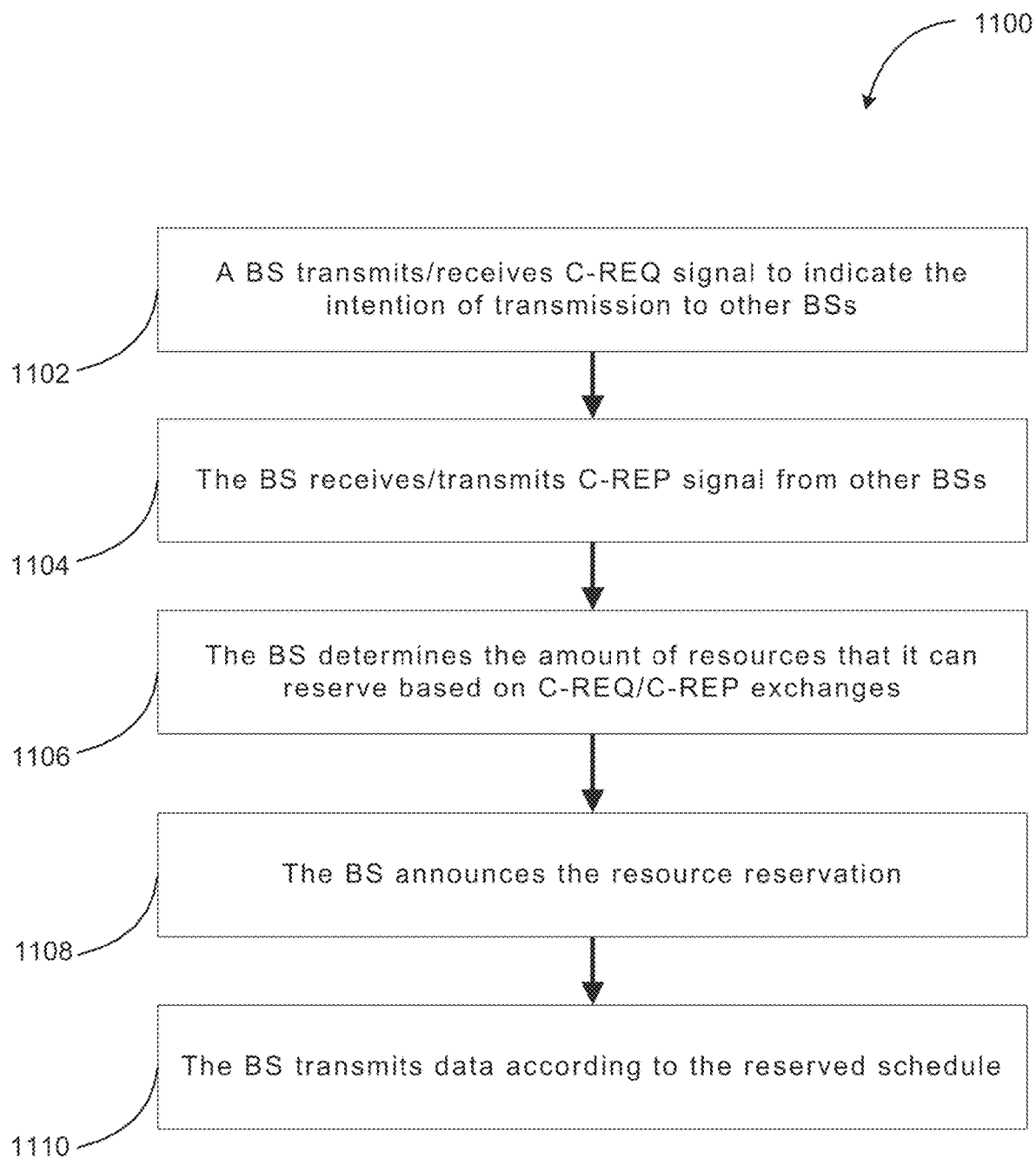
FIG. 11 illustrates a flow chart of a method for sharing framework according to embodiments of the present disclosure.

FIG. 11 illustrates a flow chart of a method 1100 for sharing framework according to embodiments of the present disclosure. For example, the method 1100 may be performed by a network entity such as any one of those discussed above with regard to FIGS. 1 and/or 8. An embodiment of the method 1100 shown in FIG. 11 is for illustration only. Other embodiments are used without departing from the scope of the present disclosure.

FIG. 11 illustrates an example of a method 1100 for coordinating and reserving the resources from a BS perspective consistent with embodiments disclosed herein. The method 1100 can be performed by a network entity (e.g., different MNOs), including the BSs 801, 802, 803, and 804, and the entity 806. At step 1102, a BS transmits a coordination request (C-REQ) message and during the CP 1002, the BS can listen to potential C-REQ message transmitted by other BSs. The transmission of C-REQ message can serve to indicate the intention of data transmission in the following DTP 1004 to other BSs. The C-REQ message can be also used by receiving BSs to measure the signal strength and, thereby, to estimate the expected level of interference during DTP 1004.

In one embodiment, the BS may transmit the C-REQ message omni-directionally, while in another embodiment, the BS may transmit the C-REQ using a beam pattern that corresponds to a transmission of the BS in the following DTP. In yet another embodiment, a BS may transmit the C-REQ using a wider beam pattern in the CP, than the beam patter the BS intends to use in the following DTP. At step 1104, the BS receives coordination response (C-REP) messages from other BSs in response to the C-REQ message transmitted at step 1102. The orders of steps 1102 and 1104 are interchangeable at each BS and a BS may transmit C-REP messages to other BSs in response to the reception of C-REQ at step 1102.

At step 1106, the BS determines the amount of resources that the BS can reserve based on C-REQ/C-REP exchanges at steps 1102 and 1104. At step 1108, the BS announces the resource reservation to other BSs. In reserving the resources, the BS can avoid conflicts with other BSs that the other BSs successfully exchanged C-REP message in a bi-directional manner at step 1102 and 1104. At step 1110, the BS transmits data according to the reserved schedule coordinated at step 1108.

In one embodiment, the CP can include interaction periods and reservation announcement periods. Each interaction period and reservation announcement period can be discretized and have integer number of sub-periods. In another embodiment, the interaction periods and reservation announcement periods can be continuous time spans for the respective periods and accessed arbitrarily.

Figure 12:
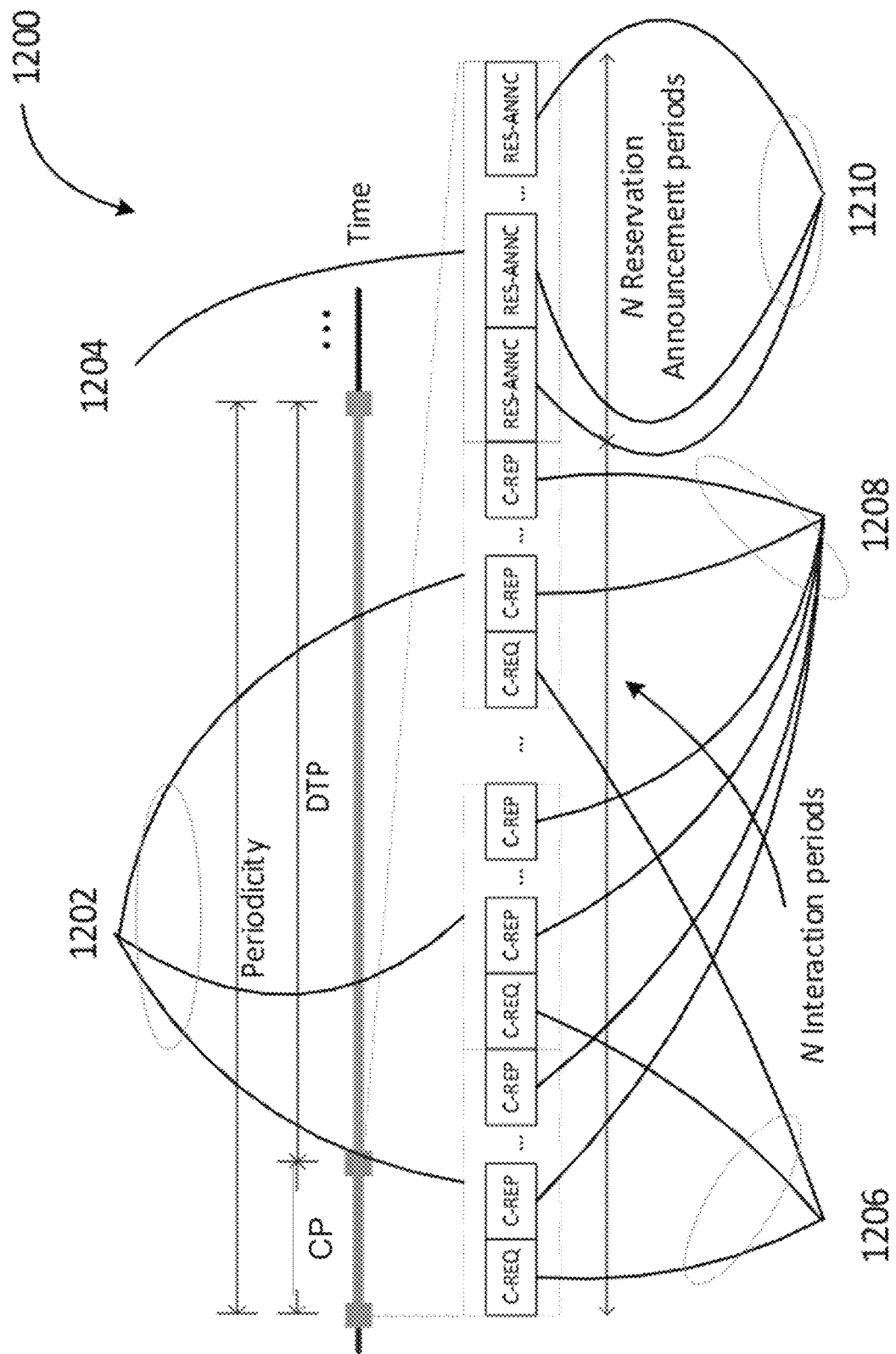
FIG. 12 illustrates an example coordination period according to embodiments of the present disclosure.

FIG. 12 illustrates an example coordination period 1200 according to embodiments of the present disclosure. An embodiment of the coordination period 1200 shown in FIG. 12 is for illustration only. Other embodiments are used without departing from the scope of the present disclosure.

FIG. 12 illustrates an exemplary structure of the CP to enable the spectrum sharing for the network 800. Each interaction period 1202 is denoted. Each reservation announcement period 1210 is denoted. A BS may have a designated interaction period number, in which the C-REQ message is transmitted in the beginning of the designated interaction period 1206. A BS may also have a designated order of transmitting C-REP messages in each of the interaction period 1208.

In one embodiment, the order of C-REP message transmission is repeated over interaction periods and a BS may be assigned multiple periods in which the BS can transmit a C-REP message. In another embodiment, the order of C-REP message transmission changes over interaction periods. In another embodiment, the C-REP transmission happens after the C-REQ messages are obtained. In another embodiment the C-REPs may be avoided, and each BS determines resource allocation only using the C-REQ messages each BS receives. In one embodiment, the C-REPs occupy the same time, frequency or code resources as the C-REQ messages, while in another embodiment the C-REPs may occupy different time, frequency or code resources.

Figure 13:
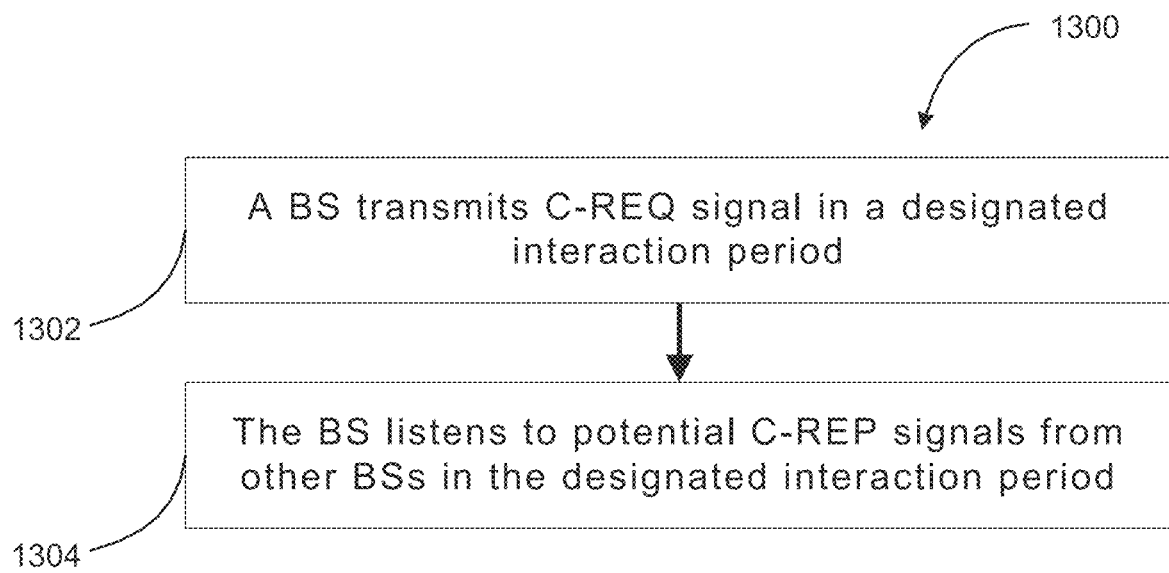
FIG. 13 illustrates a flow chart of a method within a designated interaction period according to embodiments of the present disclosure.

FIG. 13 illustrates a flow chart of a method 1300 within a designated interaction period according to embodiments of the present disclosure. For example, the method 1300 may be performed by a network entity such as any one of those discussed above with regard to FIGS. 1 and/or 8. Other embodiments are used without departing from the scope of the present disclosure.

FIG. 13 illustrates an example of a method 1300 in transmitting a C-REQ message and receiving a C-REP messages in a designated interaction period from a BS perspective consistent with embodiments disclosed herein. At step 1302, the C-REQ message is transmitted in the beginning of the designated interaction periods 1206. At step 1304, the BS listens to potential C-REP signals from other BSs in response to a C-REQ transmission of the BS during the designated interaction period 1208.

In one embodiment, a BS which does not intend to transmit during DTP can opt out of the C-REQ transmission in a designated interaction period of the BS. In another embodiment, a BS which does not intend to transmit during DTP can still transmit the C-REQ message in designated interaction period of the BS. In another embodiment, such BS which does not intend to transmit during DTP but have still transmitted C-REQ message may send null information in the reservation announcement.

In each interaction period, neighboring BSs can listen to the C-REQ message and can determine to respond with the C-REP message or not. In one embodiment, the determination can be based on the received C-REQ message strength and/or the responding node's own intended transmission power during DTP.

Figure 14:
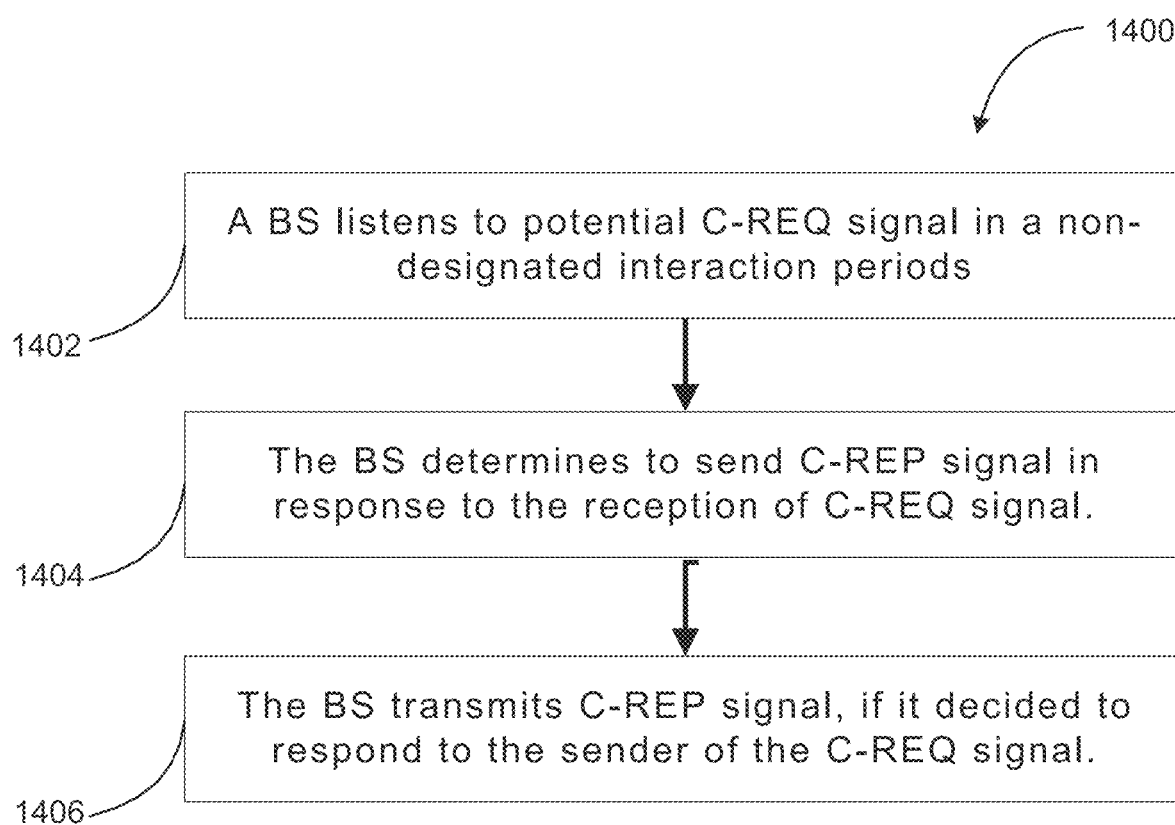
FIG. 14 illustrates a flow chart of a method within a non-designated interaction period according to embodiments of the present disclosure.

FIG. 14 illustrates a flow chart of a method 1400 within a non-designated interaction period according to embodiments of the present disclosure. An embodiment of the method 1400 shown in FIG. 14 is for illustration only. For example, the method 1400 may be performed by a network entity such as any one of those discussed above with regard to FIGS. 1 and/or 8. Other embodiments are used without departing from the scope of the present disclosure.

FIG. 14 illustrates an example of a method 1400 in receiving a C-REQ message and transmitting a C-REP messages in a non-designated interaction period from a BS perspective consistent with embodiments disclosed herein. At step 1402, a BS listens to potential C-REQ message transmitted in the beginning of each interaction period by other BSs (e.g., 1206 as illustrated in FIG. 12). At step 1404, the BS determines to transmit C-REP signals to other BSs in response to the received C-REQ signal in the beginning of the corresponding interaction period. At step 1406, the BS transmits C-REP signal. As an example, Step 1406 is executed, if it decided to respond to the sender of the received C-REQ signal at step 1404.

Figure 15:
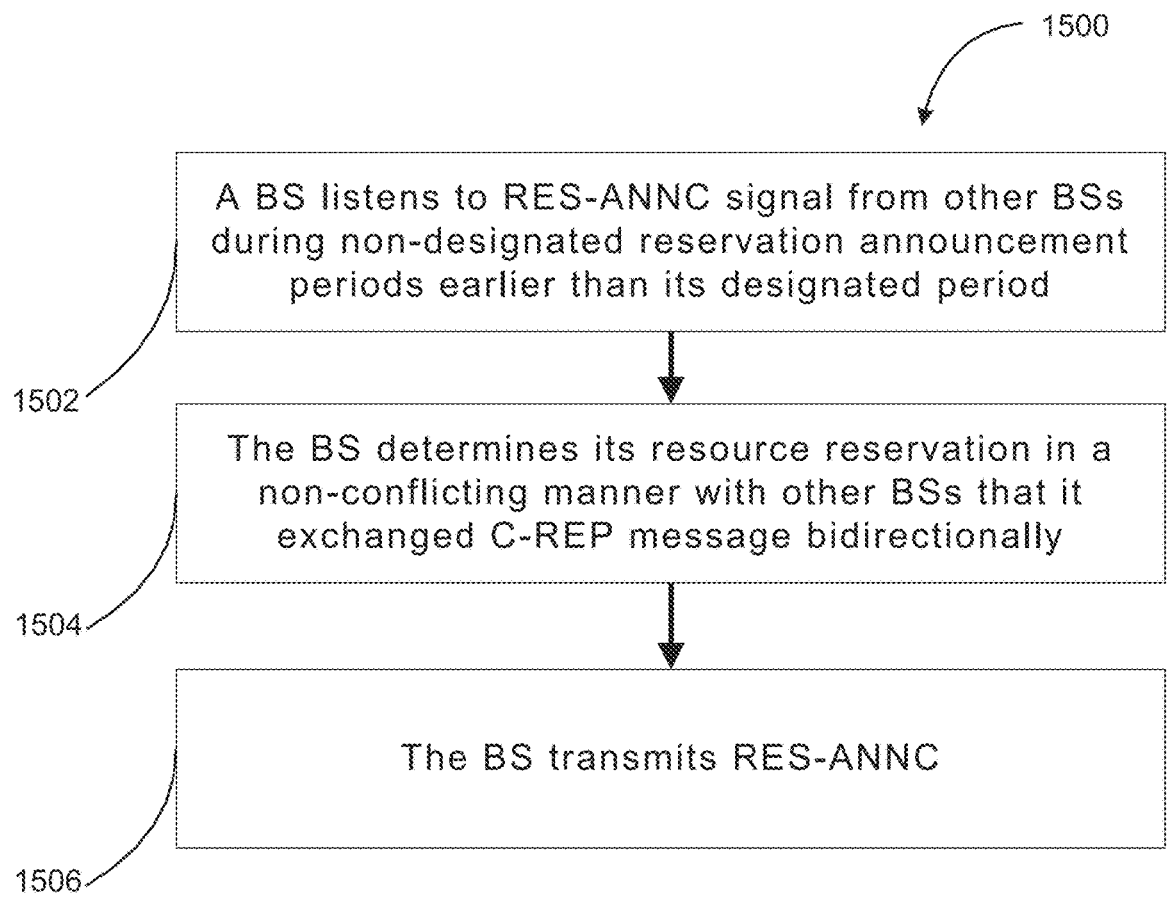
FIG. 15 illustrates a flow chart of a method during reservation announcement period according to embodiments of the present disclosure.

FIG. 15 illustrates a flow chart of a method 1500 during reservation announcement period according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

During the reservation announcement period, each BS may send out a schedule of intended transmissions during DTP in the RES-ANNC message.

FIG. 15 illustrates an example of a method 1500 in determining the resources to be reserved and the transmission of such reservation information from a BS perspective consistent with embodiments disclosed herein. At step 1502, a BS listens to RES-ANNC signal from other BSs during non-designated reservation announcement periods earlier than a designated period 1210 within the duration 1204. At step 1504, the BS determines a resource reservation in a non-conflicting manner with other BSs that the BS exchanged C-REP message bi-directionally. This operation relates to step 1106 as illustrated in FIG. 11.

In one embodiment, each BS can reserve up to $1/(N_{Tx}^{C-REP}+1)$ ratio of DTP time span, where $N_{Tx}^{C-REP}$ is the number of C-REP messages transmitted from the node sending RES-ANNC message. In another embodiment, each BS may have a different weight factor multiplied to the computed sharing ratio. In another embodiment, the BS reserves $A_{rem}/(N_{Tx,rem}^{C-REP}+1)$ ratio of DTP time span, where $A_{rem}$ is the fraction of DTP resources remaining after accounting for the BSs to whom a C-REP has been transmitted and whose RES-ANNC message has already been received, $N_{Tx,rem}^{C-REP}$ is the number of C-REP messages to remaining BSs which did not yet transmit RES-ANNC message.

At step 1504, the resource reservation may avoid the schedule announced by a neighboring BS that has sent the C-REP message previously. Thus, the order of reserving the medium, i.e., transmitting the RES-ANNC message, could affect the efficiency of the resource reservation when not all the network node can see each other. At step 1506, the BS transmits the RES-ANNC message.

Figure 16:
FIG. 16 illustrates an example Establishment of mutual relationship according to embodiments of the present disclosure.

FIG. 16 illustrates an example establishment of mutual relationship 1600 according to embodiments of the present disclosure. An embodiment of the establishment of mutual relationship 1600 shown in FIG. 16 is for illustration only. Other embodiments are used without departing from the scope of the present disclosure.

In reserving the resource, a mutual relationship between any pair of nodes can be considered. That is, if a node A transmitted a C-REP message in response to a C-REQ message from a node B but node A but did not hear back from node B in response to node A's C-REQ message, such C-REP transmissions may not be counted towards $N_{Tx}^{C-REP}$ in calculating the amount of resource one node can reserve.

FIG. 16 illustrates an embodiment relating to this situation: an MNO A BS 1 has sent a C-REP message to a MNO B BS 1 as a response to a C-REQ message received from the MNO B BS 1, as illustrated at the left of FIG. 16, however the MNO A BS 1 has not received a C-REP message from the MNO B BS 1 in return. Then, the MNO A BS 1 may consider that the MNO A BS 1 can ignore the scheduling conflict with MNO B BS 1 and may reserve the resource which could be used by the MNO B BS 1, due to the concern that the MNO B BS 1 may not honor the reservation to be made by the MNO A BS 1.

Figure 17:
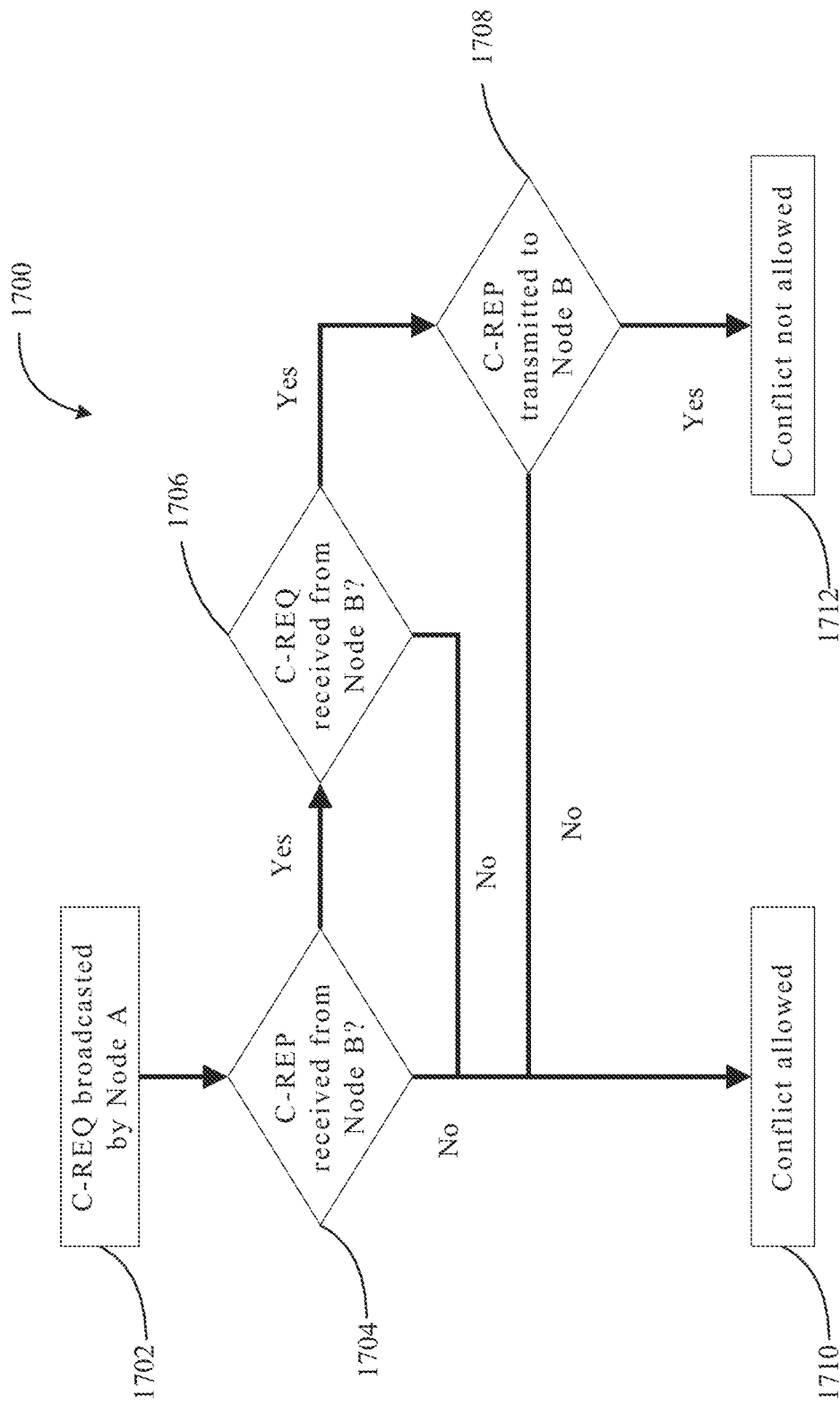
FIG. 17 illustrates a flow chart of a method for determination of mutual relationship from Node A perspective according to embodiments of the present disclosure.

FIG. 17 illustrates a flow chart of a method 1700 for determination of mutual relationship from Node A perspective according to embodiments of the present disclosure. An embodiment of the method 1700 shown in FIG. 17 is for illustration only. For example, the method 1700 may be performed by a network entity such as any one of those discussed above with regard to FIGS. 1 and/or 8. Other embodiments are used without departing from the scope of the present disclosure.

FIG. 17 illustrates an example of a method 1700 for determining a mutual relationship from a one BS perspective with respect to another BS. If bidirectional C-REP exchange fails either in step 1704 and/or step 1706 and 1708, the mutual relationship is not established and a node A is not required to avoid the conflict with a node B in determining the resources to be reserved in step 1504 in method 1500 as illustrated in FIG. 15. Note that there is no order in time between operation 1702 and 1706 is imposed, meaning that C-REQ reception from the node B could happen earlier or later in time than the C-REQ broadcast by the node A.

In one embodiment, a RES-ANNC message can include the list of neighboring BSs in a mutual relationship for the purpose of confirmation.

Figure 18:
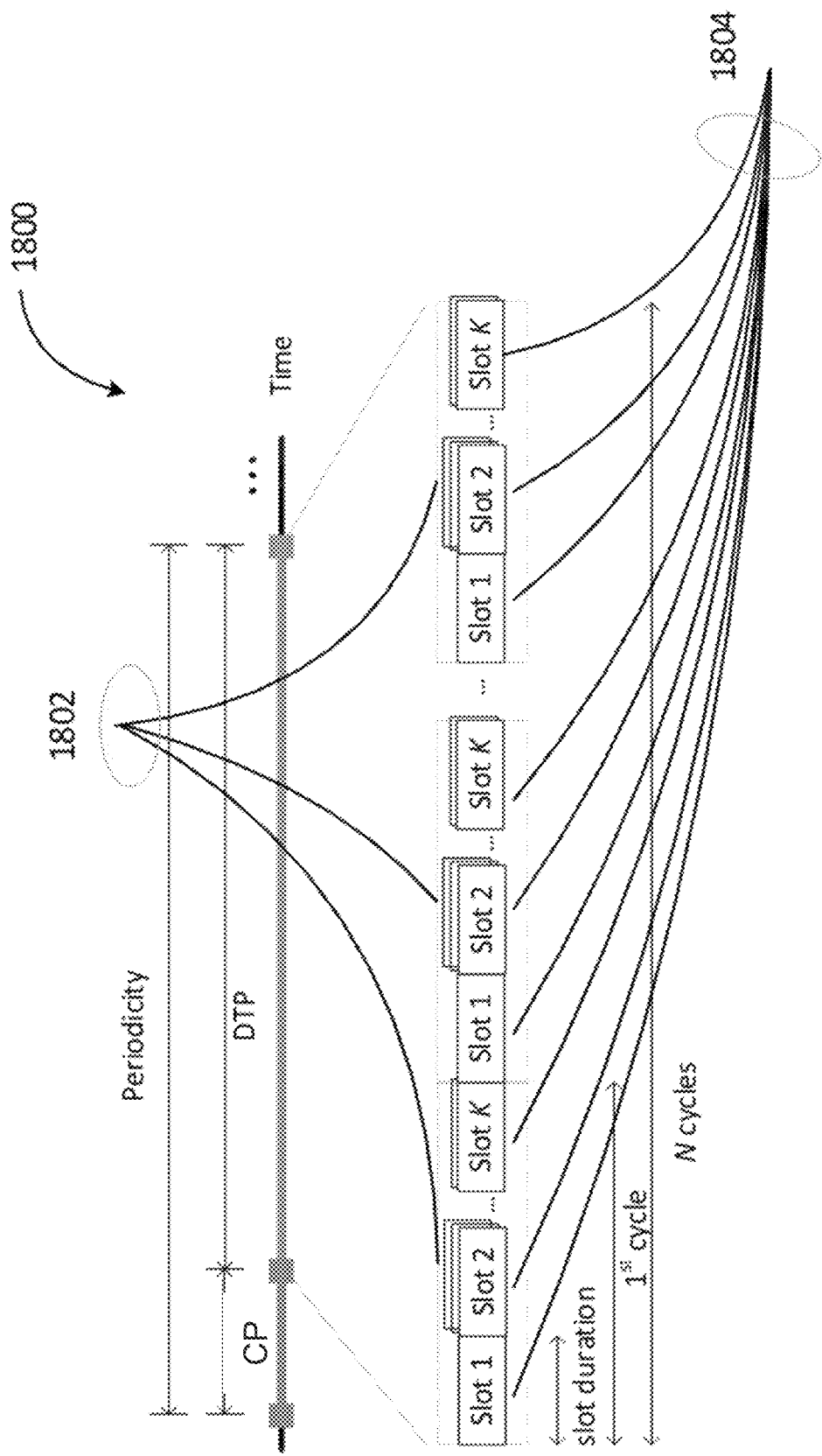
FIG. 18 illustrates an example DTP structure according to embodiments of the present disclosure.

FIG. 18 illustrates an example DTP structure 1800 according to embodiments of the present disclosure. An embodiment of the DTP structure 1800 shown in FIG. 18 is for illustration only. Other embodiments are used without departing from the scope of the present disclosure.

In some embodiments, DTP structures are provided. In one embodiment, each DTP includes N cycles (N≥1) and each cycle includes K slots. FIG. 18 illustrates an exemplary DTP structure including N cycles 1802 and K slots in cycles 1804. In another embodiment, the number of slots in a cycle may be different among the cycles and one or multiple of slots can be included in a cycle.

In RES-ANNC, the reserved slot indices within a cycle are indicated. One option is to use bitmap of size K. Alternatively, several patterns can be pre-defined, and the pattern ID can be indicated. As an example, when equal-weight sharing is used, up to $\lfloor K/N_{Tx}^{C-REP} \rfloor$ number of slots can be reserved by each BS. The reservation can repeat over N cycles if N is greater than 1, or alternatively each cycle can be separately reserved with different pattern.

In another embodiment of DTP structure, each DTP can be flexibly structured such that in RES-ANNC, the reserved duration can be indicated by a pair {starting instance, duration} or, alternatively, a pair {starting instance, end instance}. More than one disjoint time durations can be reserved so long as the total duration does not exceed the allowance.

Figure 19:
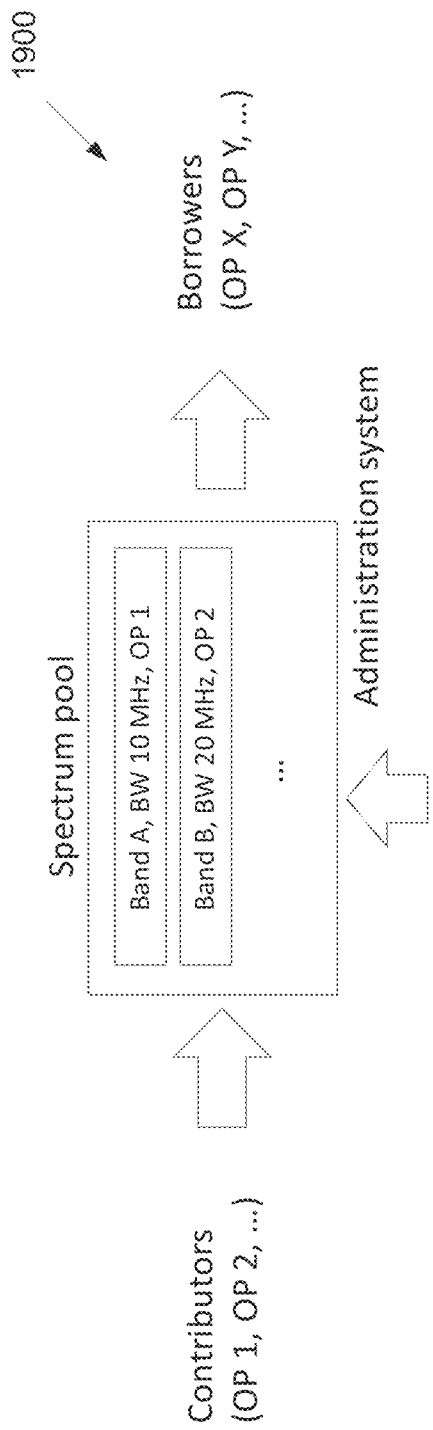
FIG. 19 illustrates an example shared spectrum pool according to embodiments of the present disclosure.

FIG. 19 illustrates an example shared spectrum pool 1900 according to embodiments of the present disclosure. An embodiment of the shared spectrum pool 1900 shown in FIG. 19 is for illustration only. Other embodiments are used without departing from the scope of the present disclosure.

As illustrated in FIG. 19, in addition to unlicensed and dedicated shared spectrum, a shared spectrum pool can be considered to be utilized under the provided framework, in which multiple operators (e.g., BS 102 and 103, BS 801-804) may contribute their licensed spectrum to be shared.

Each BS/operator may periodically inform the administration system about contribution of each BS/operator to the spectrum pool for the next period. This period may be much larger than coordination phase period. The administration system may be one of the base stations or another network entity to control or manage coordination and resource sharing among network entities in the wireless communication system.

Figure 20:
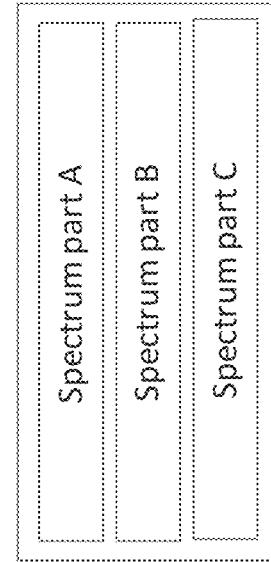
FIG. 20 illustrates an example resource reservation according to embodiments of the present disclosure.

FIG. 20 illustrates an example resource reservation according to embodiments of the present disclosure. An embodiment of the resource reservation 2000 shown in FIG. 20 is for illustration only. Other embodiments are used without departing from the scope of the present disclosure.

In the aforementioned embodiments, after the coordination phase, a reservation may be made in time-domain resource, e.g., slots. In addition, the reservation can be made in frequency domain for given units of spectrum, e.g., defined spectrum range such as CC, or for an arbitrary range of spectrum, e.g., BWP. For example, in some embodiments, there is a primary channel, e.g., specific CC or specific BWP, over which BSs perform coordination and announce spectrum reservation. In another embodiment, the C-REP/C-REQ can be sent as a wideband signal. As another example, the C-REP/C-REQ message is designed for a given bandwidth and replicated over wideband.

Figure 21:
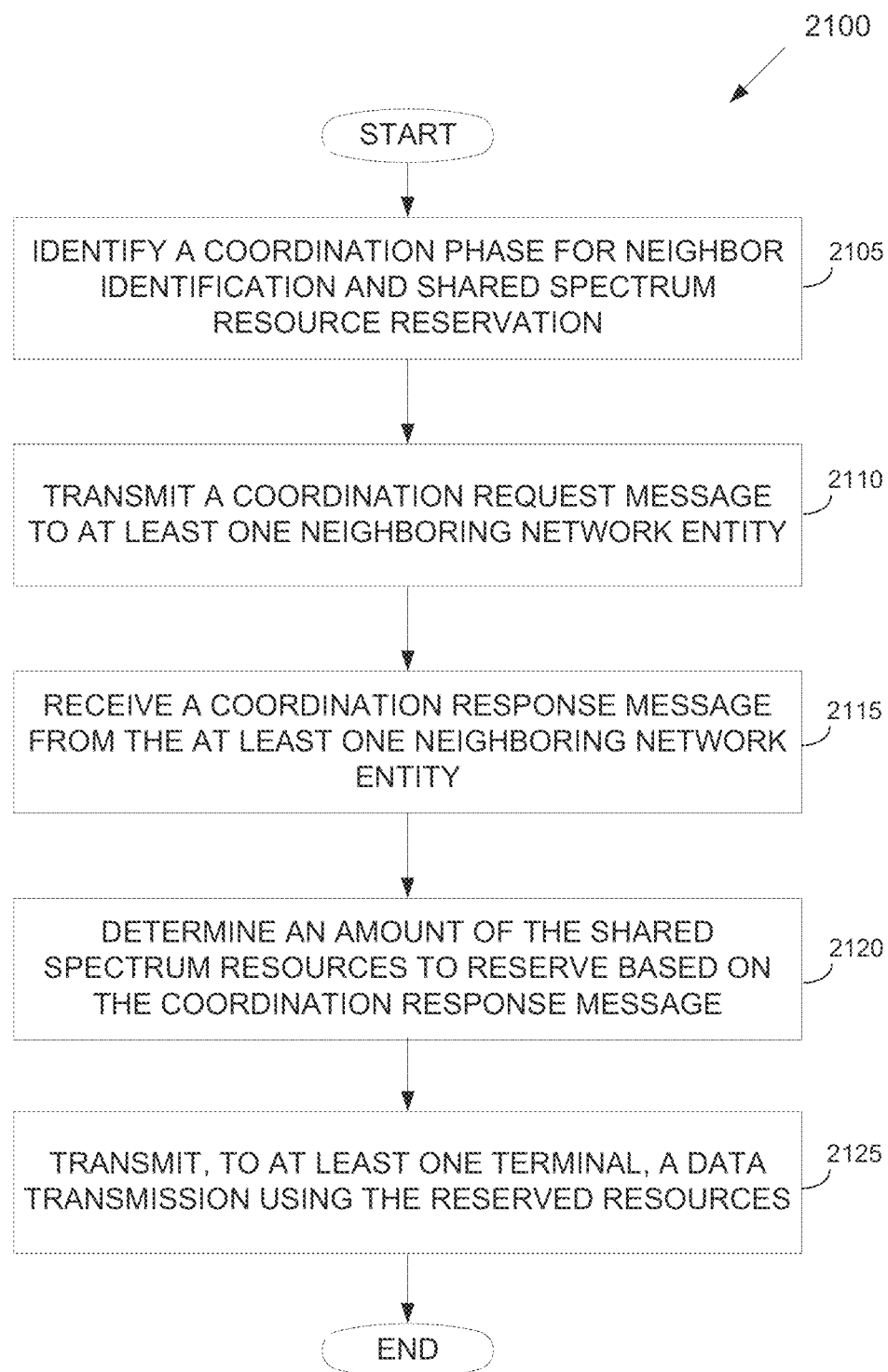
FIG. 21 illustrates an example of a method for operating a network entity in a wireless communication system of shared spectrum resources according to embodiments of the present disclosure.

FIG. 21 illustrates an example of a method 2100 for operating a network entity in a wireless communication system of shared spectrum resources according to embodiments of the present disclosure, as may be performed by a network entity (e.g., one or more of BS 102, 103, and 801-804). While described from the perspective of a single network entity, multiple network entries can perform a similar/corresponding method to allow for spectrum sharing in the wireless communication networks. An embodiment of the method 2100 shown in FIG. 21 is for illustration only. Other embodiments are used without departing from the scope of the present disclosure.

The method 2100 starts with a network entity identifying a coordination phase (step 2105). For example, during step 2105, the network entity may identify the time or frequency resources allocated to use to identify neighboring network entity(ies) using the shared spectrum resources of the wireless communication and to perform reservation of the shared spectrum resources (e.g., as discussed above with regard to FIGS. 12 and 20). In this example, the coordination phase can include an interaction period for neighbor discovery and a reservation announcement period. The shared spectrum resources can include licensed spectrum resources of the network entity and its neighbors as well as unlicensed spectrum resources (e.g., resources used for Wi-Fi, LTE, or other types of communication networks).

Thereafter, the network entity transmits, during the coordination phase, a coordination request message at least one neighboring network entity (step 2110). For example, during step 2110, the network entity transmits coordination information including, for example, parameters for data transmission, amount of resources to contribute or use, as well as information for the neighbor to judge interference.

The network entity receives, during the coordination phase, a coordination response message from the at least one neighboring network entity (step 2115). For example, during the coordination phase, the network entity exchanges coordination request and response messages with other network entities. In various embodiments, the coordination request messages can be used to determine interference from neighbors. For example, based on coordination request message(s) received by the network entity, the network entity can identify its neighbors as well as an amount of interference (e.g., based on a receive signal power of the coordination request message) that may be caused its neighbors (e.g., as discussed above with regard to FIGS. 14-16). The network entity may also determine whether to transmit, to the at least one neighboring network entity, a coordination response message in response to the received coordination request message based on the identified interference. For example, if the amount of interference from the neighbor is low (e.g., as determined based on a receive signal power of the coordination request message from the neighbor), the network entity may not need to transmit a coordination response message because that neighbor may be far enough away or the transmitting with a low enough power level to not cause interference to the network entity. In various embodiments, the network entity may also generate a list of neighboring network entities that the network entity has successfully exchanged coordination request and response messages with and share this list of neighboring network entities with its neighbors to confirm mutual neighbors. Additionally, in some embodiments, the coordination phase messages may be transmitted and received in a designated interaction slot or frequency (e.g., as discussed above with regard to FIG. 13). In other embodiments, the coordination phase messages may be transmitted and received in outside of a designated interaction slot or frequency (e.g., as discussed above with regard to FIG. 14).

Thereafter, the network entity determines an amount of the shared spectrum resources to reserve based on the coordination response message (step 2120). For example, during step 2120, the network entity uses information about the possible interference and resource reservations of its neighbor to determine the resources to reserve. In one example, the network entity identifies resources that are to be used by the neighboring network entity(ies) that the network entity successfully transmitted the coordination request message to and received the coordination response message from and identify other resources to reserve as the reserved resources that avoid overlap with the resources that are to be used by the neighboring network entity(ies) (e.g., as discussed above with regard to FIG. 17).

The network entity may also identify neighboring network entity(ies) that the network entity sent a coordination request message to but did not receive a coordination response message from. Then, in determining the amount of the shared spectrum resources to reserve, the network entity can ignore these neighboring network entity entity(ies) in determining the resource reservation. As part of determining the resources to reserve, the network entity may use a reservation ratio generated based on (i) a quantity of neighboring network entities that the network entity has successfully exchanged coordination request and response messages with and/or (ii) a priority factor (e.g., soft prioritization) for the network entity that is determined based on contribution to the shared spectrum resources by the network entity.

Additionally, as part of step 2120, the network entity may, during the reservation announcement period, transmit, to the neighboring network entity(ies), information about the reserved resources. For example, the network entity may indicate, via a reservation announcement message, reserved slots in a number of slots within a number of cycles in a data transmission phase where the reserved slots being repeated over each of the number of cycles during the data transmission phase (e.g., as discussed in FIG. 18). and may use a bitmap indicating a size of the reserved slots based on the number of slots within each of the number of cycles. The reserved slots can be indicated by a starting instance, a duration, and an ending instance, a pattern of the number of slots within each of the number of cycles can be indicated in the reservation announcement message. Additionally or alternatively, the reservation of the reserved resources is made in a frequency domain for given units of the shared spectrum resources and the reservation announcement message is transmitted over a specific bandwidth (e.g., CC) or transmitted as a wideband signal (e.g., as discussed in FIG. 20).

The network entity then transmits, to terminal(s) in a cell of the network entity, data using the determined reserved resources (step 2125). For example, during step 2125, the network entity uses the reserved resources for data transmission during the data transmission phase (e.g., as discussed above with regard to FIGS. 18 and 20).

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A network entity in a wireless communication system of shared spectrum resources, the network entity comprising:
    a processor configured to identify a coordination phase to identify at least one neighboring network entity using the shared spectrum resources and perform reservation of the shared spectrum resources; and
    a transceiver operably connected to the processor, the transceiver configured to:
        transmit, during the coordination phase, a coordination request message to the at least one neighboring network entity; and
        receive, during the coordination phase, a coordination response message from the at least one neighboring network entity,
    wherein the processor is configured to:
        determine an amount of the shared spectrum resources to reserve based on the coordination response message;
        identify resources that are to be used by the at least one neighboring network entity that the network entity successfully transmitted the coordination request message to and received the coordination response message from; and
        identify other resources to reserve as the reserved resources that avoid the resources that are to be used by the at least one neighboring network entity, and
    wherein the transceiver is configured to transmit, to at least one terminal in a cell of the network entity, a data transmission using at least some of the determined amount of the reserved resources.

2. The network entity of claim 1, wherein:
    the coordination phase includes an interaction period, and during the interaction period:
        the transceiver is configured to transmit, to the at least one neighboring network entity, parameters for the data transmission in the coordination request message,
        the processor is further configured to identify interference by the at least one neighboring network entity based on a coordination request message received from the at least one neighboring network entity; and
        the transceiver is configured to transmit, to the at least one neighboring network entity, a coordination response message in response to the received coordination request message based on the identified interference.

3. The network entity of claim 2, wherein:
    the coordination phase further includes a reservation announcement period, and during the reservation announcement period, the transceiver is configured to transmit, to the at least one neighboring network entity, information about the reserved resources.

4. The network entity of claim 1, wherein:
    the processor is further configured to generate a list of neighboring network entities that the network entity has successfully exchanged coordination request and response messages with, the list of neighboring network entities including the at least one neighboring network entity,
    the transceiver is configured to:
        transmit the list of neighboring network entities to the at least one neighboring network entity, and
        receive, the at least one neighboring network entity, a list of neighboring network entities of the at least one neighboring network entity, and
    the processor is configured to identify the other resources to reserve as the reserved resources based on the transmitted and received lists of neighboring network entities.

5. The network entity of claim 1, wherein the processor is further configured to, in determining the amount of the shared spectrum resources to reserve, determine a reservation ratio based on (i) a quantity of neighboring network entities that the network entity has successfully exchanged coordination request and response messages with and (ii) a priority factor for the network entity that is determined based on contribution to the shared spectrum resources by the network entity.

6. The network entity of claim 5, wherein the processor is further configured to:
    identify one or more neighboring network entities that the network entity sent a coordination request message to but did not receive a coordination response message from; and
    in determining the amount of the shared spectrum resources to reserve, ignore the one or more neighboring network entities in determining the reservation ratio.

7. The network entity of claim 1, wherein:
    the processor is further configured to determine a designated interaction slot to transmit the coordination request message; and
    the transceiver is further configured to receive, from the at least one neighboring network entity, the coordination response message in response to the coordination request message during the designated interaction slot.

8. The network entity of claim 1, wherein the shared spectrum resources comprise a first set of licensed spectrum resources of the network entity, a second set of licensed spectrum resources of the at least one neighboring network entity, and unlicensed spectrum resources.

9. The network entity of claim 1, wherein:
    the processor is further configured to:
        indicate, via a reservation announcement message, reserved slots in a number of slots within a number of cycles in a data transmission phase, the reserved slots being repeated over each of the number of cycles during the data transmission phase; and
        identify a bitmap indicating a size of the reserved slots based on the number of slots within each of the number of cycles;
    the reserved slots are indicated by a starting instance, a duration, and an ending instance;

a pattern of the number of slots within each of the number of cycles is indicated in the reservation announcement message;

reservation of the reserved resources is made in a frequency domain for given units of the shared spectrum resources; and the reservation announcement message is transmitted over a specific bandwidth or as a wideband signal.

10. A method for a network entity in a wireless communication system sharing spectrum resources, the method comprising:

identifying a coordination phase to identify at least one neighboring network entity using the shared spectrum resources and perform reservation of the shared spectrum resources;

transmitting, during the coordination phase, a coordination request message to the at least one neighboring network entity;

receiving, during the coordination phase, a coordination response message from the at least one neighboring network entity;

determining an amount of the shared spectrum resources to reserve based on the coordination response message;

identifying resources that are to be used by the at least one neighboring network entity that the network entity successfully transmitted the coordination request message to and received the coordination response message from;

identifying other resources to reserve as the reserved resources that avoid the resources that are to be used by the at least one neighboring network entity; and transmitting, to at least one terminal in a cell of the network entity, a data transmission using at least some of the determined amount of the reserved resources.

11. The method of claim 10, wherein:

the coordination phase includes an interaction period, and the method further comprises, during the interaction period:

transmitting, to the at least one neighboring network entity, parameters for the data transmission in the coordination request message;

identifying interference by the at least one neighboring network entity based on a coordination request message received from the at least one neighboring network entity; and transmitting, to the at least one neighboring network entity, a coordination response message in response to the received coordination request message based on the identified interference.

12. The method of claim 11, wherein:

the coordination phase further includes a reservation announcement period, and the method further comprises, during the reservation announcement period, transmitting, to the at least one neighboring network entity, information about the reserved resources.

13. The method of claim 10, further comprising:

generating a list of neighboring network entities that the network entity has successfully exchanged coordination request and response messages with, the list of neighboring network entities including the at least one neighboring network entity, transmitting the list of neighboring network entities to the at least one neighboring network entity, and receiving, the at least one neighboring network entity, a list of neighboring network entities of the at least one neighboring network entity, wherein identifying the other resources to reserve as the reserved resources comprises identifying the other resources to reserve as the reserved resources based on the transmitted and received lists of neighboring network entities.

14. The method of claim 10, wherein determining the amount of the shared spectrum resources to reserve comprises determining a reservation ratio based on (i) a quantity of neighboring network entities that the network entity has successfully exchanged coordination request and response messages with and (ii) a priority factor for the network entity that is determined based on contribution to the shared spectrum resources by the network entity.

15. The method of claim 14, further comprising:

identifying one or more neighboring network entities that the network entity sent a coordination request message to but did not receive a coordination response message from, wherein determining the amount of the shared spectrum resources to reserve comprises ignoring the one or more neighboring network entities in determining the reservation ratio.

16. The method of claim 10, further comprising:

determining a designated interaction slot to transmit the coordination request message; and receiving, from the at least one neighboring network entity, the coordination response message in response to the coordination request message during the designated interaction slot.

17. The method of claim 10, wherein the shared spectrum resources comprise a first set of licensed spectrum resources of the network entity, a second set of licensed spectrum resources of the at least one neighboring network entity, and unlicensed spectrum resources.

18. The method of claim 10, further comprising:

indicating, via a reservation announcement message, reserved slots in a number of slots within a number of cycles in a data transmission phase, the reserved slots being repeated over each of the number of cycles during the data transmission phase; and identifying a bitmap indicating a size of the reserved slots based on the number of slots within each of the number of cycles, wherein the reserved slots are indicated by a starting instance, a duration, and an ending instance, wherein a pattern of the number of slots within each of the number of cycles is indicated in the reservation announcement message, wherein reservation of the reserved resources is made in a frequency domain for given units of the shared spectrum resources, and wherein the reservation announcement message is transmitted over a specific bandwidth or as a wideband signal.

* * * * *